United States Patent [19]
Taylor et al.

[11] 3,842,343
[45] Oct. 15, 1974

[54] REMOTE PRESS TO TEST INDICATING LIGHT CIRCUIT

[75] Inventors: Glenn R. Taylor; Walter J. Kellogg, both of Beaver, Pa.

[73] Assignee: Westinghouse Electric Corporation, Pittsburgh, Pa.

[22] Filed: Sept. 26, 1973

[21] Appl. No.: 401,096

[52] U.S. Cl. ................................. 324/21, 340/214
[51] Int. Cl. ............................................ G01r 31/22
[58] Field of Search .................. 324/20, 21, 22, 23; 340/214, 251

[56] References Cited
UNITED STATES PATENTS
2,839,741   6/1958   Kratville ............................. 340/213
3,040,243   6/1962   Weiss .................................. 324/20

Primary Examiner—Alfred E. Smith
Assistant Examiner—Rolf Hille
Attorney, Agent, or Firm—H. G. Massung

[57] ABSTRACT

A circuit is provided for remotely testing indicator lights whereby multiple lights may be tested simultaneously by pressing a pushbutton and closing one set of normally opened contacts. In one embodiment of the invention, an indicator light is connected in series with a circuit component which can be switched on by applying a triggering signal. Each switchable circuit component is connected to an indicator circuit which can be activated from some external circuit device. A test circuit is connected to all switchable circuit components to activate them all when a test of the multiple indicator lights is desired. In another embodiment of the invention, a plurality of indicator lights are fed through individual indicator circuit connected through full wave rectifiers. A rectified test signal which is controlled by a single pushbutton can be fed through a test circuit to all the individual indicator lights for testing operability.

16 Claims, 4 Drawing Figures

REMOTE PRESS TO TEST INDICATING LIGHT CIRCUIT

BACKGROUND OF THE INVENTION

This invention relates to a test circuit for indicator lamps and more particularly to an improved circuit for simultaneously testing multiple indicator lamp by depressing a single pushbutton.

On modern machinery there are many applications where multiple indicator lights are used. It is advantageous to have a means of rapidly testing many indicator lamps by depressing a single pushbutton. A problem with some of the prior art test circuits is that many relays or multipoled pushbuttons are required in the test circuit. In some of the prior art indicator circuits, the normal indicator signal circuits, the test circuits, and the indicator lamp circuits are all operated at the same potential. It is desirable to have an indicating light circuit in which the test pushbutton and the indicator signal circuit are at one potential while the indicator lamp is maintained at a different potential. It is also desirable to have a signal and test circuit combination which is highly reliable and not susceptible to showing erroneous indications. It is desirable that a malfunction in one component of the indicator lamp circuit will not cause erroneous signal lamp lighting.

SUMMARY OF THE INVENTION

An indicator lamp circuit is provided in which multiple indicator lamps can be tested by depressing a single normally open pushbutton. In one embodiment of the invention a signal circuit and a test circuit are provided with provisions for preventing the flow of test current in the signal circuit and the flow of signal current in the test circuit. Current flow in the operating signal circuit or the test circuit does not light the indicator lamps directly, but instead switches on a switchable circuit component such as SCR, triac or trigger glow tube which allows operation of the indicator lamp from a separate current source. This circuit has the advantage of eliminating polarity problems, a low manufacturing cost and the use of either an alternating current or a direct current operating signal or test signal.

In another embodiment of the invention, an indicator lamp circuit is provided having a direct current actuated indicator lamp being fed through two full wave rectifier bridges. One of the full wave rectifier bridges is connected to the operating indicator signal circuit and the other full wave rectifier bridge is connected to the test circuit. The positive and negative connections of each bridge are wired in series with the two connections of the indicator lamp and in parallel with each other, so that direct current will pass only in one direction through the indicator. The alternating current connections of the indicator signal bridge shall be wired in series with an indicator current source and the alternating current connections of the test bridge shall be wired in series with a test current source. Application of the test current source is controlled by a pushbutton or similar device. Application of the operating indicator current source is controlled by a remote device. In this circuit, there are no possibilities of any polarity problem. The indicator lamp sees full wave rectified current when activated. A failure of any one rectifier comprising the full wave bridge members will not cause erroneous operation of any indicator lamps. In case of a rectifier failure, the bridge so effected will be capable of only one half wave rectification and this will cause the indicator lamp to light at a low intensity when activated through this effected bridge. Utilizing full wave bridge rectifiers reduces the possibility that a test signal can enter the indicator signal circuit or that an indicator signal can enter the test signal circuit. In another embodiment of the invention, a one half wave rectifier can be used in place of the full wave test rectifier.

It is an object of this invention to provide an inexpensive highly reliable circuit for testing indicating lamps utilizing an AC or DC test signal.

BRIEF DESCRIPTION OF THE DRAWINGS

For a better understanding of the invention, reference may be had to the preferred embodiments exemplary of the invention shown in the accompanying drawings, in which.

DESCRIPTION OF THE PREFERRED EMBODIMENTS

Figure 1:
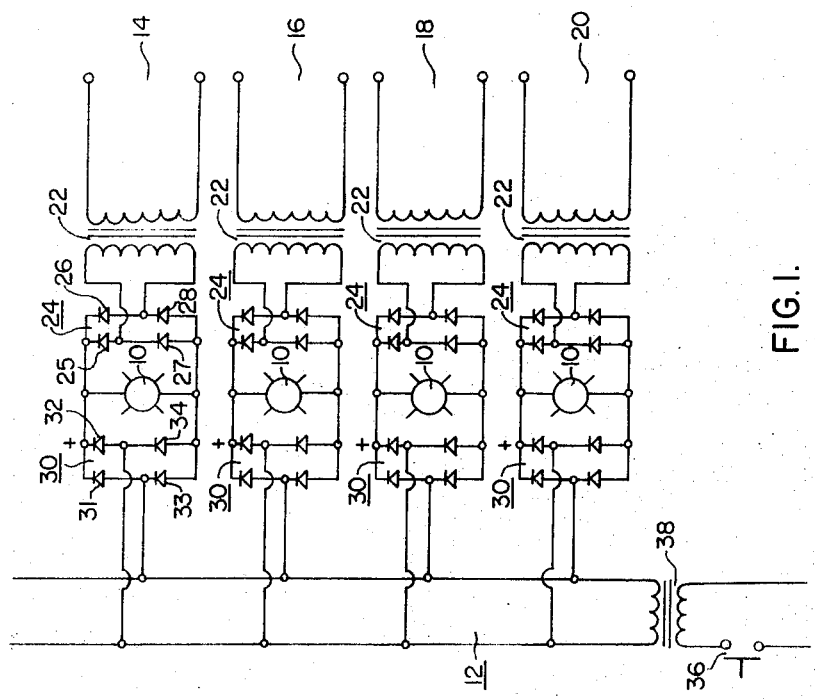
FIG. 1 illustrates a test circuit utilizing the teaching of the present invention.

Referring now to the drawings and FIG. 1 in particular, there is shown a remote press detector indicating light circuit utilizing the teaching of the present invention. The plurality of the indicator lights 10 are connected to a test circuit 12. Each indicator light 10 is connected to a signal circuit 14, 16, 18 or 20. The signal circuits 14, 16, 18 and 20 apply current to light lamp 10 in response to some external stimulation. Each operating signal circuit 14, 16, 18 or 20 is connected to an associated lamp 10 through a transformer 22. The output of each transformer 22 is connected to a full wave bridge rectifier 24 comprising diodes 25, 26, 27 and 28. Full wave rectifier bridge 24 may be constructed from individual diodes 25, 26, 27 and 28 to be a single component. Test current from test circuit 12 activates lamp 10 through a full wave rectifier 30 comprising diodes 31, 32, 33 and 34, when operability check of lamps 10 is initiated. Full wave rectifier 24 and 30 supply a DC output to light lamp 10 when energized. Circuit 12 is energized by pressing a test pushbutton 36 which supplies current to the circuit 12 through transformer 38. Test signal rectifier 30 and operating signal rectifier 24 provide complete isolation of the operating signal circuits 14, 16, 18 or 20 from the test circuit 12. When operating signal circuit 14, 16, 18 or 20 is energized due to the operation of some remote device (not shown) the associated indicator lamp 10 lights. The operating signal circuit 14, 16, 18 or 20 are isolated from the test circuit 12 so that operation of any signal circuit 14, 16, 18 or 20 will not operate any other signal circuit 14, 16, 18 or 20. When pushbutton 36 is depressed, test circuit 12 is energized and all operable lamps 10 light. This allows testing of all the indicating lamps on a panel or in particular area when it is not feasible to use individual pushbutton test devices. The positive and negative connections of each full wave rectifier bridge 24 and 30 are associated with an indicator lamp 10, are wired in parallel with each other and in series with the connection of the indicator lamp 10 so that direct current will pass in one direction only through associated indicator lamp 10.

For an incandescent lamp it is better to operate the lamp at rated socket voltage full wave direct or alternating current than to operate it at almost twice rated socket voltage with a pulsating current. Full wave current at rated voltage will give superior bulb life when compared to operation with pulsating current at increased voltage. With the circuit shown in FIG. 1 the test transformer voltage can be set lower than the nominal bulb voltage. Thus the light intensity of bulb 10 on test will be lower than on a normal on condition during operation. This makes it possible to test lights 10 while machinery is operating and still allow the operator to be able to determine which lights are on due to an operating signal.

Figure 2:
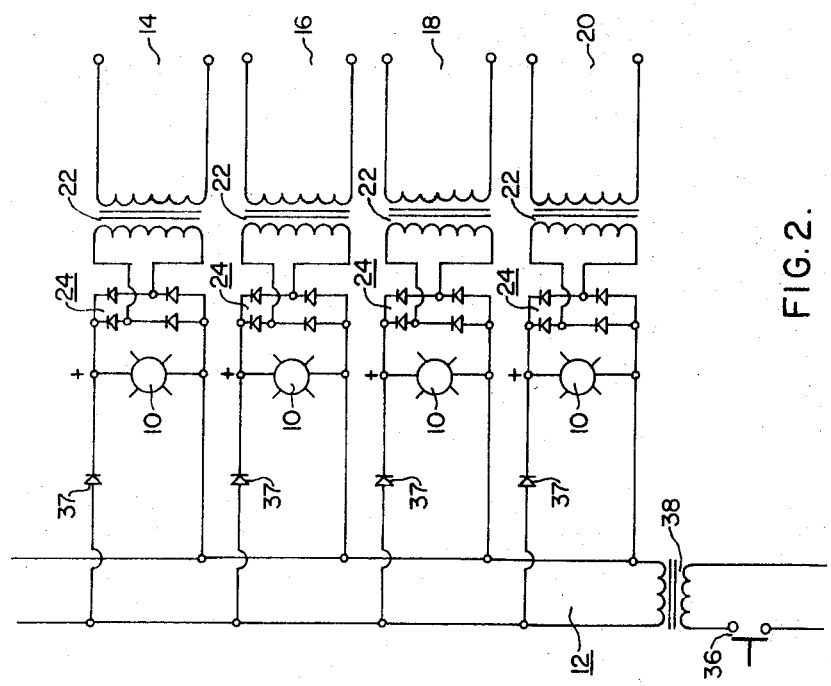
FIG. 2 illustrates an indicator lamp test circuit similar to FIG. 1 wherein the full wave bridge rectifier in the test circuit is replaced by one half wave rectifier.

FIG. 2 shows an alternate embodiment wherein a half-wave rectifier 37 replaces the full wave test rectifier 30 of FIG. 1. In this embodiment, when the test pushbutton 36 is depressed, a one half rectified wave causes lamp 10 to light. During normal operation when a signal circuit 14, 16, 18 or 20 is energized, lamp 10 would see a full rectified wave. Lamp 10 will burn with a higher intensity when a signal is applied from a normal operating circuit 14, 16, 18 or 20 than when a test signal is applied through test circuit 12. Thus, it is possible to discern if an operating signal is being applied to lamp 10 even with the test pushbutton 36 depressed.

Figure 3:
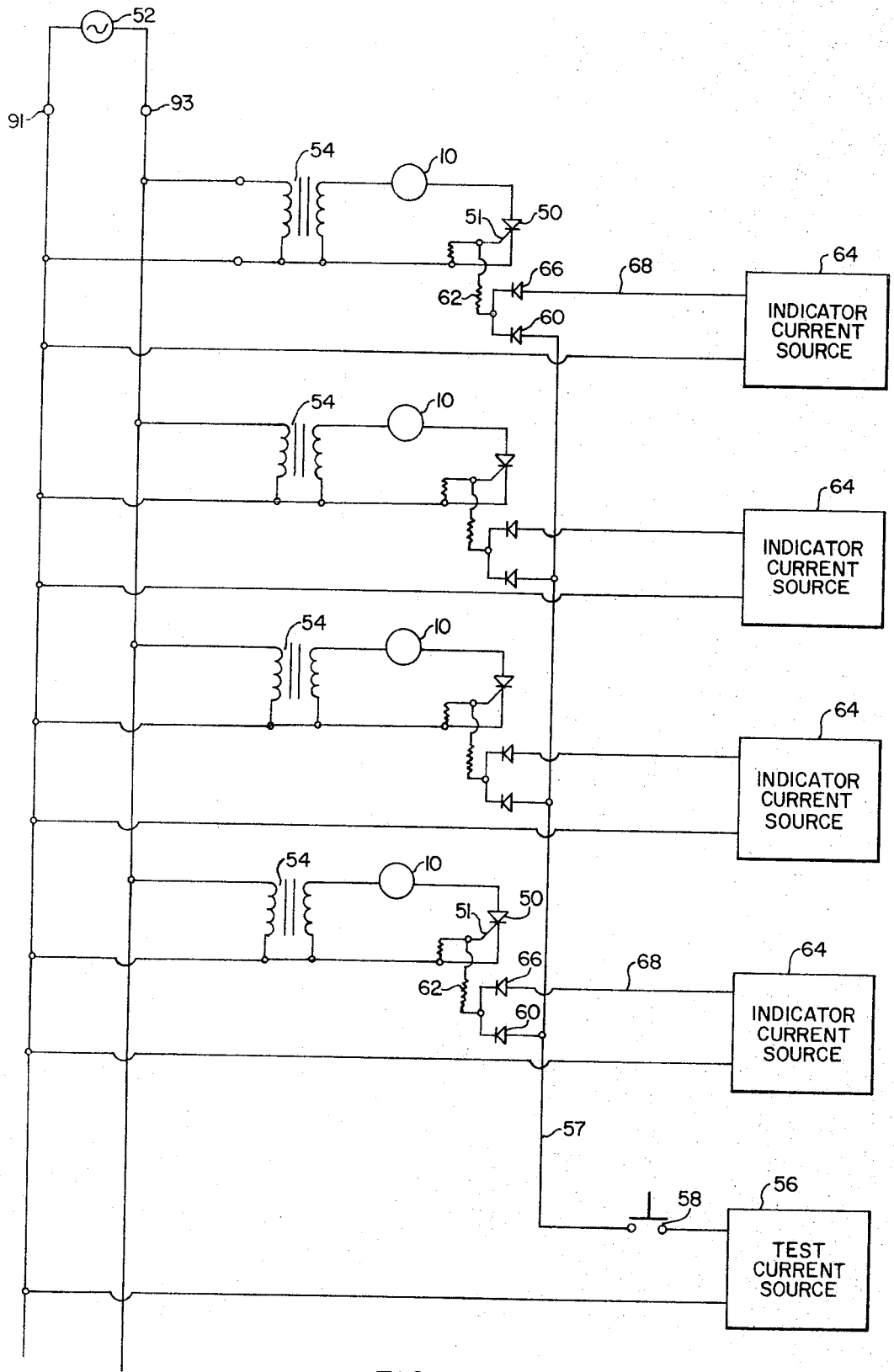
FIG. 3 illustrates another embodiment of the invention utilizing a switchable device in series with each individual indicator lamp; and, FIG. 4 illustrates an indicator lamp circuit similar to FIG. 3 with a modification to the triggering connection of the switchable component.

Referring now to FIG. 3, there is shown another embodiment of the invention. A plurality of indicator lights 10 are disposed in series with a switchable component 50, which in this case is an SCR, which controls current flow and operation of lamp 10. An alternating current supply 52 connected to terminals 91 and 93 supplies current to all lamps 10 through individual transformers 54. Switch 50 can be turned on by application of an operating signal or a test signal. A test current source 56 is provided for supplying test current along line 57 when pushbutton 58 is depressed to activate all SCR's 50. Test line 57 is connected to all the gates 51 of SCR 50 through a diode 60 and a resistor 62. Depressing pushbutton 58 supplies a current through the gates 51 of all SCR's 50 and causing them to conduct. Indicator current sources 64 are provided to supply an indicator signal through the gate 51 of SCR 50, to make it conduct and light lamp 10. Each lamp 10 is controlled by an indicator current source 64 which is responsive to the operation of a remote circuit devices. A diode 66 is disposed in the line 68 extending from the indicator current source 64 to the gate resistor 62. Diode 60 and 66 prevent the flow of test current in the indicating circuit and the flow of indicating current in the test circuit. The indicator current or the test current do not directly light the indicator lamp 10 but instead switch on SCR 50 that operates the light from the separate AC power source 52. This construction eliminates polarity problems, offers a low manufacturing cost and provides a simple design. The indicator and test inputs or current sources 64 and 56 respectively can be either AC or DC. No external transformer is required for the indicator signal or the test current signal and even where there are many lights 10 on a panel, the test current will be low so that no special switch is required.

Figure 4:
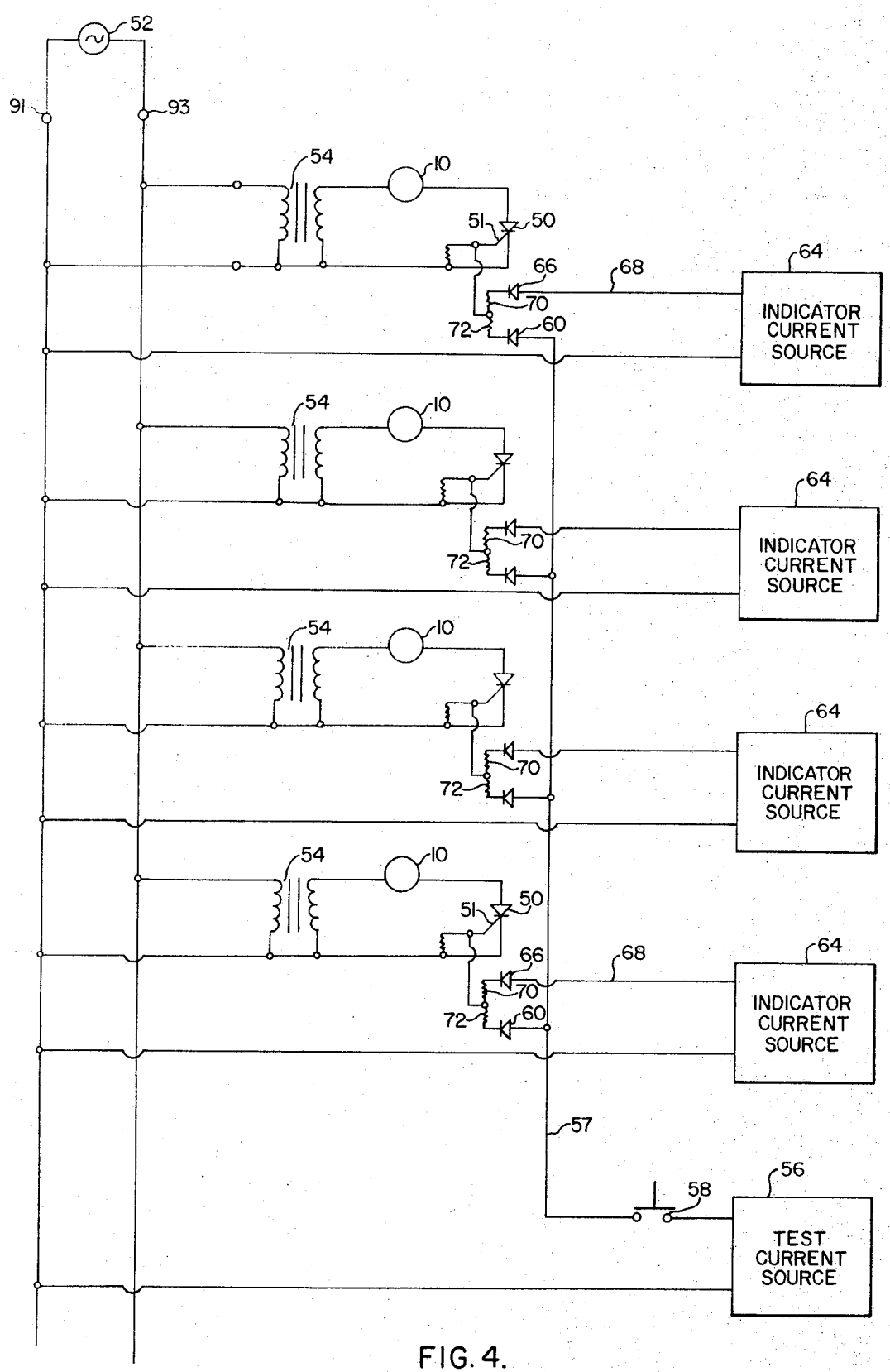

Referring now to FIG. 4 there is shown another solid state press to test indicating light circuit wherein gate resistor 62 is replaced by two resistors 70 and 72 disposed in the indicating signal circuit and the test signal circuit respectively. By having these two resistors 70 and 72 which have a relatively high value, even if the diode 66 should fail the amount of test current which could flow into line 68 is kept small and can do little damage. Operation of this circuit is similar to that explained above, and all indicating lights 10 can be tested by depressing single pushbutton 58.

We claim:

1. An indicator light circuit comprising:
   a plurality of indicator lights;
   terminal means connected to a power supply means for supplying power to each of said plurality of indicator lights;
   a plurality of switch means, one of said switch means disposed in series with each of said indicator lights, and each of said switch means being switchable from a non-conducting state preventing current flowing through said indicator light and a conductor state allowing current flow through said indicator light;
   a plurality of operating signal circuit means, each one connected to one of said plurality of switch means for switching said associated switch means to a conducting state in response to an external operating signal;
   test circuit means connected to all of said plurality of switch means for switching all of said switch means to a conducting state in response to a manually originated operability check of the indicator lights; and,
   isolating means for preventing current flow from any of said operating signal circuit means into said test circuit means.

2. An indicator light circuit as claimed in claim 1 wherein each of said plurality of switch means comprises:
   a silicon controlled rectifier disposed in series with one of said plurality of indicator lights and having a gate through which current can pass to switch said silicon controlled rectifier from a non-conducting state to a conducting state;
   said signal circuit means is connected to the gate of said silicon controlled rectifier; and,
   said test circuit means is connected to the gate of said silicon controlled rectifier.

3. An indicator light circuit as claimed in claim 2 wherein:
   said isolating means comprising a first diode associated with each of said plurality of indicator lights disposed in the connection of said test circuit means to the gate of said silicon controlled rectifier.

4. An indicator light circuit as claimed in claim 3 including:
   a second diode associated with each silicon controlled rectifier and disposed in the connection of said signal circuit means to the gate of said silicon controlled rectifier.

5. An indicator light circuit as claimed in claim 4 wherein:

the output terminal of said first diode is connected to the output terminal of said second diode; and, a gate resistor is disposed in the connection of the gate of said silicon controlled rectifier to the output terminal of said first and second diode.

6. An indicator light circuit as claimed in claim 4 including:
a first resistor connected to one end to the output terminal of said first diode and at the other end to the gate of said silicon controlled rectifier; and,
a second resistor connected at one end to the output of said second diode and at the other end to the gate of said silicon controlled rectifier.

7. An indicator light circuit as claimed in claim 1 including a transformer disposed between said indicator light and said power supply means.

8. An indicator light circuit comprising:
a plurality of indicator lamps connected to a power supply;
a plurality of silicon controlled rectifiers each being connected in series with one of said plurality of indicator lamps and having a gate connection for switching said silicon controlled rectifier from a non-conducting state to a conducting state;
an operating signal circuit connected to the gate of each of said silicon controlled rectifiers;
operating signal current means for energizing said operating signal circuit in response to an external operating signal;
a test circuit connected to the gates of all silicon controlled rectifiers;
test current means connected to said test circuit for energizing said test circuit to check the operability of said lamps; and,
a plurality of diodes each being disposed in the connection of said test circuit to the gate of said silicon controlled rectifier to prevent current flowing from the signal circuits into the test circuit.

9. An indicator light circuit as claimed in claim 8 including a diode disposed in said operating signal circuit to prevent current from flowing from said test circuit into said operating signal circuit.

10. An indicator light circuit as claimed in claim 9 wherein:
the output of said test circuit diode and the output of said signal circuit diode are connected; and,
a resistor is inserted in the connection between the gate of said silicon controlled rectifier and the output of said test diode and said signal diode.

11. An indicator light circuit as claimed in claim 9 wherein:
a first resistor is disposed in the connection between the gate of said silicon controlled rectifier and the output of said test circuit diode; and,
a second resistor is disposed in the connection between the output of said signal circuit diode and the gate of said silicon controlled rectifier.

12. An indicator light circuit comprising;
a plurality of indicator lamps;
operating signal circuit means connected to each of said plurality of indicator lamps to supply current in response to the operation of a remote device;
a first full wave rectifier bridge disposed in the connection of said operating signal circuit means to said associated indicator lamp so that said indicator lamp is supplied with full wave direct current when activated by said operating signal circuit means;
test circuit means for supplying a test current to all of said plurality of indicator lamps when a test of the operability of said indicator lamps is desired; and,
current rectifying means disposed in the connection of said test circuit means to each of said plurality of indicator lamps to restrict the flow of current from said operating signal circuit means into said test circuit means.

13. An indicator light circuit as claimed in claim 12 wherein said current rectifying means is a second diode.

14. An indicator light circuit as claimed in claim 12 wherein said current limiting means is a full wave rectifier bridge.

15. An indicator light circuit as claimed in claim 12 wherein said test current means comprises:
a transformer; and,
a pushbutton disposed on the primary side of said transformer for controlling current flow through said transformer and said test circuit means.

16. An indicator light circuit as claimed in claim 15 wherein said transformer is sized so that the test current supplied during testing is less than the current supplied from said operating signal means when activated so that the light intensity of said indicator lamp during test is less than the intensity when operated from said operating signal means.

* * * * *